UNITED STATES PATENT OFFICE.

HARRY S. MORK, OF BOSTON, MASSACHUSETTS, ASSIGNOR TO CHEMICAL PRODUCTS COMPANY, OF BOSTON, MASSACHUSETTS, A CORPORATION OF MAINE.

PROCESS OF TREATING CELLULOSE ESTERS.

1,061,771.  Specification of Letters Patent.  Patented May 13, 1913.

No Drawing.  Application filed February 10, 1910. Serial No. 543,098.

*To all whom it may concern:*

Be it known that I, HARRY S. MORK, of Boston, county of Suffolk, State of Massachusetts, have invented an Improvement in Processes of Treating Cellulose Esters, of which the following is a specification.

This invention relates to a process of treating cellulose esters.

In the known processes for preparing cellulose esters of the fatty acids, as, for example, cellulose acetate or acetyl cellulose, it is common to use sufficient of the appropriate fatty acid anhydrid (in the case of cellulose acetate, acetic anhydrid), which is the effective acetylating agent, to produce an acetylated cellulose of a high degree of acetylation, usually the triacetate. In Letters Patent #854,374, granted to me there is embodied a form of cellulose acetate in which the cellulose structure from which it is derived is conserved, and which possesses in a relatively high degree the properties of a colloid. Cellulose triacetate, prepared according to my aforesaid patent, is very useful and valuable for many purposes, and from it can be made strong and flexible sheets or films and filaments and other structures which are very waterproof and water repellent. I have found, however, that this fibrous cellulose triacetate can be treated in such manner as to produce in whole or in part lower acetates of cellulose, and that such fibrous lower acetates of cellulose are preferable in their qualities for some purposes.

My invention involves the process of preparing lower acetates of cellulose, which consists in removing from a higher acetate in which the fibrous structure of the original cellulose is conserved a portion of the combined acid. The partial saponification or removal of part of the combined acid of the ester may be effected in a number of different ways and by the application of the usual saponifying chemicals, such as sodium or potassium hydroxid, hydrochloric or sulfuric acids, or by some reagents not ordinarily used for the purpose, such as sodium carbonate and ammonia. The saponifying chemicals should be of such strength and employed in such manner that the fibrous structure of the cellulose is not destroyed thereby. An alkline saponifying agent however is preferred as it avoids a weakening of the cellulose structure which might be caused by the employment of an acid. For example, if fibrous cellulose triacetate, such as may be prepared according to my patent aforesaid, be allowed to stand with aqueous ammonia of specific gravity 0.9 for sixteen hours at 15° to 20° C. saponification will gradually take place, but the removal of a portion of the combined acid by the action of the saponifying agent does not take place in definite stages, whereby the triacetate is converted to the diacetate and monoacetate, but proceeds progressively according to conditions. Under certain conditions the action proceeds slowly so that it can be stopped at a point which approximates either the diacetate or the monoacetate. In the example above stated, if from the acetate the saponifying liquids and other products of the treatment are removed by pressure or in a centrifugal and then by washing, the acetate will then contain chemically combined an amount of acetic acid practically the same as of the diacetate, and is insoluble in acetone, alcohol, ether, acetylene-tetrachlorid, carbon tetrachlorid, chloroform and glacial acetic acid, but is soluble in phenol. However, if such fibrous cellulose triacetate be boiled for two hours with an aqueous solution of sodium hydroxid containing four grams of sodium hydroxid in one liter of water, the cellulose triacetate will be converted practically into cellulose monoacetate and is insoluble in all the above mentioned chemicals. The conversion therefore is not a definite one as to the production of diacetate and monoacetate, and the examples above given mean that the amount of acetic acid left in the cellulose acetate is of approximately the same quantity as will be in cellulose diacetate and in cellulose monoacetate. These results may likewise be reached by using a stronger solution for a shorter time or the saponification may be carried further, if desired, by stronger chemicals, greater heat, or longer time or both. It is not the purpose of my process to produce a definite chemical compound however, but merely to carry on a partial saponification.

An advantage of the exercise of my invention is the fact that even if the original cellulose triacetate is very flexible and strong, the flexibility and strength are noticeably increased by subjecting the triacetate to partial saponification.

In other applications Serial No. 562,318 filed May 19th, 1910, and Serial Nos. 637,857 and 637,858, filed July 11, 1911, which are divisions of this application, are embodied a sheet or film, filament and the like, and a process of preparing the same involving the exercise of this invention.

I claim:

1. The process of preparing lower acetates of cellulose which consists in treating cellulose triacetate in which the fibrous structure of the original cellulose is conserved with a saponifying agent until a portion of the combined acid is removed.

2. The process of preparing lower acetates of cellulose which consists in treating the higher acetate in which the fibrous structure of the original cellulose is conserved with a saponifying agent until a portion of the combined acid is removed.

In testimony whereof, I have signed my name to this specification, in the presence of two subscribing witnesses.

HARRY S. MORK.

Witnesses:
H. B. DAVIS,
B. J. NOYES.